United States Patent
Rojkov et al.

(10) Patent No.: US 10,942,938 B2
(45) Date of Patent: Mar. 9, 2021

(54) CACHING FOR QUERY PROCESSING SYSTEMS

(71) Applicant: SAP SE, Walldorf (DE)

(72) Inventors: Alexandre Rojkov, North Vancouver (CA); Mohsen Asadi, Vancouver (CA); Richard Mar, Burnaby (CA); Christopher Tam, Vancouver (CA)

(73) Assignee: SAP SE, Walldorf (DE)

( * ) Notice: Subject to any disclaimer, the term of this patent is extended or adjusted under 35 U.S.C. 154(b) by 686 days.

(21) Appl. No.: 15/693,338

(22) Filed: Aug. 31, 2017

(65) Prior Publication Data

US 2019/0065560 A1 Feb. 28, 2019

(51) Int. Cl.

| | | |
|---|---|---|
| *G06F 16/2458* | (2019.01) | |
| *G06F 12/0811* | (2016.01) | |
| *G06F 12/0875* | (2016.01) | |
| *G06F 16/22* | (2019.01) | |
| *G06F 16/23* | (2019.01) | |
| *G06F 16/957* | (2019.01) | |
| *G06F 16/2455* | (2019.01) | |

(52) U.S. Cl.
CPC ...... *G06F 16/2474* (2019.01); *G06F 12/0811* (2013.01); *G06F 12/0875* (2013.01); *G06F 16/2272* (2019.01); *G06F 16/2329* (2019.01); *G06F 16/9574* (2019.01); *G06F 16/24552* (2019.01); *G06F 2212/283* (2013.01); *G06F 2212/452* (2013.01)

(58) Field of Classification Search
None
See application file for complete search history.

(56) References Cited

U.S. PATENT DOCUMENTS

| | | | | |
|---|---|---|---|---|
| 8,346,929 | B1 * | 1/2013 | Lai | H04L 63/20 709/226 |
| 8,655,878 | B1 * | 2/2014 | Kulkarni | G06F 16/43 707/736 |
| 9,697,253 | B2 * | 7/2017 | Chidambaran | ... G06F 16/24552 |
| 2001/0054131 | A1 * | 12/2001 | Alvarez, II | H04N 19/42 711/105 |
| 2005/0262059 | A1 * | 11/2005 | White | G06F 16/24552 |
| 2009/0018998 | A1 * | 1/2009 | Patten, Jr. | G06F 16/958 |
| 2011/0184936 | A1 * | 7/2011 | Lymberopoulos | G06F 16/9574 707/721 |
| 2014/0090081 | A1 * | 3/2014 | Mattsson | G06F 21/6218 726/27 |
| 2015/0134763 | A1 * | 5/2015 | Balakrishnan | G06F 9/44505 709/208 |
| 2017/0017688 | A1 * | 1/2017 | Das | G06F 16/2453 |

(Continued)

*Primary Examiner* — Richard L Bowen
(74) *Attorney, Agent, or Firm* — Fountainhead Law Group P.C.

(57) ABSTRACT

Some embodiments provide a non-transitory machine-readable medium that stores a program. The program receives a query for data from a client device. The program further generates a key based on the query for the data. The program also selects a cache service instance in a plurality of cache service instances. The program further sends the cache service instance the key and a request for a cached version of the data. The program also receives the cached version of the data from the cache service instance. The program further processes the query based on the cached version of the data. The program also sends a result set for the query to the client device.

20 Claims, 9 Drawing Sheets

(56) References Cited

U.S. PATENT DOCUMENTS

2017/0177860 A1* 6/2017 Suarez .................... G06F 21/53
2018/0341653 A1* 11/2018 Teotia ................. G06F 16/2255

* cited by examiner

CACHING FOR QUERY PROCESSING SYSTEMS

BACKGROUND

Modern computer systems often comprise an application program and a database. The application program may present a user interface that allows users to perform a wide range of data processing tasks. The application program may be a cloud application, for example. Data received in the system can be stored in the database. Many users may send queries and/or instructions to these computing systems to interact with data in the database. For example, a user may send a query for data in the database that satisfy certain criteria, an instruction to add data to the database, an instruction to remove data from the database, an instruction to modify data in the database, etc.

SUMMARY

In some embodiments, a non-transitory machine-readable medium stores a program. The program receives a query for data from a client device. The program further generates a key based on the query for the data. The program also selects a cache service instance in a plurality of cache service instances. The program further sends the cache service instance the key and a request for a cached version of the data. The program also receives the cached version of the data from the cache service instance. The program further processes the query based on the cached version of the data. The program also sends a result set for the query to the client device.

In some embodiments, the query for the data may be a first query for a first data, the client device may be a first client device, the key may be a first key, the cache service instance may be a first cache service instance, the request may be a first request, and the result set may be a first result set. The program may further receive a second query for second data from a second client device. The program may also generate a second key based on the second query for the second data. The program may further select a second cache service instance in the plurality of cache service instances. The program may also send the second cache service instance the second key and a second request for a cached version of the second data. The program may further receive the cached version of the second data from the second cache service instance. The program may also process the second query based on the cached version of the second data. The program may further send a second result set for the second query to the second client device.

In some embodiments, the query for the data may be a first query for a first data, the client device may be a first client device, the key may be a first key, the cache service instance may be a first cache service instance, the request may be a first request, and the result set may be a first result set. The program may further receive a second query for second data from a second client device. The program may also generate a second key based on the second query for the second data. The program may further determine that the first key and the second key are the same. The program may also store a copy of the cached version of the first data. The program may further process the second query based on the copy of the cached version of the first data. The program may also send a second result set for the second query to the second client device.

In some embodiments, the program may further identify a user with which the query is associated and retrieve user access rights of the user. Generating the key may be further based on the user access rights of the user. The plurality of cache service instances may operate on a computing device separate from the device. The program may further receive an indication of a cache miss instead of the cached version of the data from the cache service instance. In response to receiving the indication, the program may also send a request for the data to a data storage configured to store the data. The program may further receive the data from the data storage. The program may also send the cache service instance the data from the database and a request to cache the data. Processing the query may be based on the data from the data storage instead of the cached version of the data. the query for the data may be a first query for a first data, the client device may be a first client device, the key may be a first key, the cache service instance may be a first cache service instance, the request may be a first request, and the result set may be a first result set. The program may further put the data from the database and the first key in a cache queue. The program may also receive a second query for second data from a second client device. The program may further generate a second key based on the second query for the second data. The program may also determine that the second key and the matches the first key in the cache queue. The program may further retrieve a copy of the cached version of the first data from the cache queue. The program may also process the second query based on the copy of the cached version of the first data. The program may further send a second result set for the second query to the second client device.

In some embodiments, a method receives a query for data from a client device. The method further generates a key based on the query for the data. The method also selects a cache service instance in a plurality of cache service instances. The method further sends the cache service instance the key and a request for a cached version of the data. The method also receives the cached version of the data from the cache service instance. The method further processes the query based on the cached version of the data. The method also sends a result set for the query to the client device.

In some embodiments, the query for the data may be a first query for a first data, the client device may be a first client device, the key may be a first key, the cache service instance may be a first cache service instance, the request may be a first request, and the result set may be a first result set. The method may further receive a second query for second data from a second client device. The method may also generate a second key based on the second query for the second data. The method may further select a second cache service instance in the plurality of cache service instances. The method may also send the second cache service instance the second key and a second request for a cached version of the second data. The method may further receive the cached version of the second data from the second cache service instance. The method may also process the second query based on the cached version of the second data. The method may further send a second result set for the second query to the second client device.

In some embodiments, the query for the data may be a first query for a first data, the client device may be a first client device, the key may be a first key, the cache service instance may be a first cache service instance, the request may be a first request, and the result set may be a first result set. The method may further receive a second query for second data from a second client device. The method may also generate a second key based on the second query for the second data.

The method may further determine that the first key and the second key are the same. The method may also store a copy of the cached version of the first data. The method may further process the second query based on the copy of the cached version of the first data. The method may also send a second result set for the second query to the second client device.

In some embodiments, the method may identify a user with which the query is associated and retrieve user access rights of the user. Generating the key may be further based on the user access rights of the user. The method may operate on a first computing device and the plurality of cache service instances may operate on a second, different computing device. The method may further receive an indication of a cache miss instead of the cached version of the data from the cache service instance. In response to receiving the indication, the method may also send a request for the data to a data storage configured to store the data. The method may further receive the data from the data storage. The method may also send the cache service instance the data from the database and a request to cache the data. Processing the query may be based on the data from the data storage instead of the cached version of the data. the query for the data may be a first query for a first data, the client device may be a first client device, the key may be a first key, the cache service instance may be a first cache service instance, the request may be a first request, and the result set may be a first result set. The method may further put the data from the database and the first key in a cache queue. The method may also receive a second query for second data from a second client device. The method may further generate a second key based on the second query for the second data. The method may also determine that the second key and the matches the first key in the cache queue. The method may further retrieve a copy of the cached version of the first data from the cache queue. The method may also process the second query based on the copy of the cached version of the first data. The method may further send a second result set for the second query to the second client device.

In some embodiments, a system includes a set of processing units and a non-transitory computer-readable medium that stores instructions. The instructions cause at least one processing unit to receive a query for data from a client device. The instructions further cause the at least one processing unit to generate a key based on the query for the data. The instructions also cause the at least one processing unit to select a cache service instance in a plurality of cache service instances. The instructions further cause the at least one processing unit to send the cache service instance the key and a request for a cached version of the data. The instructions also cause the at least one processing unit to receive the cached version of the data from the cache service instance. The instructions further cause the at least one processing unit to process the query based on the cached version of the data. The instructions also cause the at least one processing unit to send a result set for the query to the client device.

In some embodiments, the query for the data may be a first query for a first data, the client device may be a first client device, the key may be a first key, the cache service instance may be a first cache service instance, the request may be a first request, and the result set may be a first result set. The instructions may further cause the at least one processing unit to receive a second query for second data from a second client device. The instructions may also cause the at least one processing unit to generate a second key based on the second query for the second data. The instructions may further cause the at least one processing unit to select a second cache service instance in the plurality of cache service instances. The instructions may also cause the at least one processing unit to send the second cache service instance the second key and a second request for a cached version of the second data The instructions may further cause the at least one processing unit to receive the cached version of the second data from the second cache service instance. The instructions may also cause the at least one processing unit to process the second query based on the cached version of the second data. The instructions may further cause the at least one processing unit to send a second result set for the second query to the second client device.

In some embodiments, the query for the data may be a first query for a first data, the client device may be a first client device, the key may be a first key, the cache service instance may be a first cache service instance, the request may be a first request, and the result set may be a first result set. The instructions may further cause the at least one processing unit to receive a second query for second data from a second client device. The instructions may also cause the at least one processing unit to generate a second key based on the second query for the second data. The instructions may further cause the at least one processing unit to determine that the first key and the second key are the same. The instructions may also cause the at least one processing unit to store a copy of the cached version of the first data. The instructions may further cause the at least one processing unit to process the second query based on the copy of the cached version of the first data. The instructions may also cause the at least one processing unit to send a second result set for the second query to the second client device.

In some embodiments, the instructions may further cause the at least one processing unit to identify a user with which the query is associated and retrieve user access rights of the user. Generating the key may be further based on the user access rights of the user. The plurality of cache service instances may operate on a computing device separate from the system. The instructions may further cause the at least one processing unit to receive an indication of a cache miss instead of the cached version of the data from the cache service instance. In response to receiving the indication, the instructions may also cause the at least one processing unit to send a request for the data to a data storage configured to store the data. The instructions may further cause the at least one processing unit to receive the data from the data storage. The instructions may also cause the at least one processing unit to send the cache service instance the data from the database and a request to cache the data. Processing the query may be based on the data from the data storage instead of the cached version of the data.

The following detailed description and accompanying drawings provide a better understanding of the nature and advantages of the present invention.

DETAILED DESCRIPTION

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Described herein are techniques for providing caching for a query processing system. In some embodiments, the query processing system includes several cache service instances that are configured to handle cache requests. When the query processing system receives a request for data from a client device, the query processing system selects a cache service instance to handle the request. The selected cache service instance determines whether data for the query is stored in a cache. If so, the cache service instance retrieves the cached data to use for processing the query. Otherwise, the cache service instance retrieves the data from a storage in which the data is being persisted to use for processing the query. The retrieved data is also cached for later use.

In some embodiments, a data model is defined as one or more views and one or more tables associated with the one or more views. A view can be a filter associated with one or more tables that provides access to one or more attributes (e.g., columns) of the one or more tables. Alternatively or in addition, a view may provide access to data calculated based on and/or derived from one or more attributes of the one or more tables. In some instances, a view can be a filter associated with one or more views and/or tables that provides access to one or more attributes of the one or more views and/or tables. In some embodiments, a data model definition specifies a one or more tables that includes a set of measures and a set of dimensions. In some such embodiments, a measure may be an attribute in the one or more tables that is configured to store a numeric value while a dimension may be an attribute in the one or more tables that is configured to store a value associated with a measure that is used for categorizing the measure.

Figure 1:
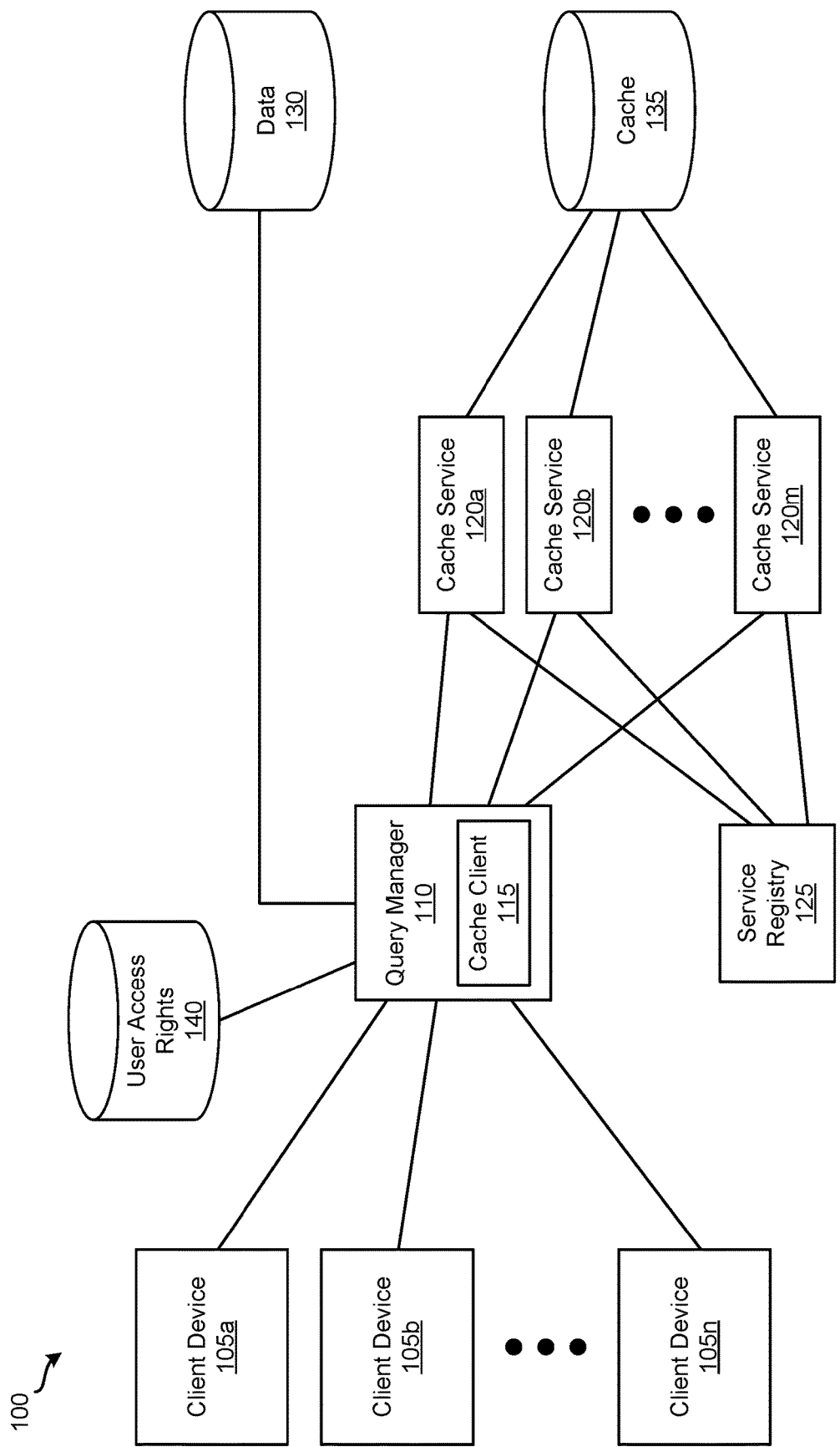
FIG. 1 illustrates a system for providing caching features according to some embodiments.

FIG. 1 illustrates a system 100 for providing caching features according to some embodiments. As shown, system 100 includes client devices 105a-n, query manager 110, cache service instances 120a-m, service registry 125, and storages 130-140. In some embodiments, query manager 110 operates on a computing device different from the computing device on which cache service instances 120a-m operates. Data storage 130 is configured to store data organized according to data models. Cache storage 135 stores recently retrieved data and/or often-used data. In some embodiments, cache storage 135 stores data using a key-value storage. Cache storage 135 may be implemented using a distributed cache platform. In some embodiments, cache storage 135 is an in-memory storage. User access rights storage 140 is configured to store user access rights to data stored in data storage 130 for users of client devices 105a-n. In some embodiments, storages 130-140 are implemented in a single physical storage while, in other embodiments, storages 130-140 may be implemented across several physical storages. While FIG. 1 shows storages 130-140 as part of system 100, one of ordinary skill in the art will appreciate that storages 130, 135, and/or 140 may be external to system 100 in some embodiments.

Client devices 105a-n are each configured to communicate and interact with query manager 110. For instance, a client device 105 may send query manager 110 a query for data stored in data storage 130. Once the query is processed, the client device 105 receives the data from query manager 110. The client device 105 may then perform further processing on the received data, present the received data in a visualization, send the received data to another system, etc.

Query manager 110 is responsible for processing queries for data stored in data storage 130. As shown in FIG. 1, query manager 110 includes cache client 115. Cache client 115 handles caching aspects of the query processing. For instance, when query manager 110 receives a query for data stored in data storage 130, query manager 110 sends the query to cache client 115 to check for cached data. To process the query, cache client 115 may send service registry 125 a request for a list of available cache service instances. In some embodiments, the list of available cache service instances includes an Internet protocol (IP) address and a port number for each cache service instances 120 in the list of available cache service instances. From the list of available cache service instances, cache client 115 selects a cache service instance 120 and uses the IP address and port number associated with the selected cache service instance 120 to establish a connection to the cache service instance 120. In some embodiments, cache client 115 selects a cache service instance 120 from the list of available cache service instances using a round robin approach. In other embodiments, cache client 115 selects a cache service instance 120 from the list of available cache service instances by determining the least-used cache service instance in the list of available cache service instances and selecting the least-used cache service instance.

Next, cache client 115 generates a key based on the query, user access rights of a user with which the query is associated, and a timestamp associated with the latest change to data storage 130. In some embodiments, a user with which a query is associated is a user of a client device 105 from which query manager 110 receives the query. The user access rights of different users may be configured to have access to the same and/or different data stored in data storage 130. In some embodiments, the user access rights configured for a user are specified in terms of a dimension filter on the data stored in data storage 130. For example, if data stored in data storage 130 includes global car sales data, user access rights for a first user can specify car sales data in North America, user access rights for a second user can specify car sales data in Europe, user access rights for a third user can specify car sales data in all countries, user access rights for a fourth user can specify car sales data in Asia, and user access rights for a fifth user can specify car sales data in North America. In such an example, the first user and the fifth user have the same the user access rights, which are different than the user access rights of the second, third, and fourth users.

To generate a key based on the query and user access rights of a user with which the query is associated, and a timestamp associated with the latest change to data storage 130, cache client 115 identifies the user with which the query is associated and accesses user access rights storage 140 to retrieve the user access rights of the user. Also, cache client 115 sends data storage 130 a request for a timestamp associated with the latest change to data in data storage 130. In some embodiments, when data in data storage 130 is modified, data storage 130 sends cache client 115 a timestamp associated with the modification. In some such embodiments, instead of sending data storage 130 a request for the timestamp associated with the latest change to data storage 130, cache client 115 uses the most recent timestamp received from data storage 130. Then, cache client 115 uses a hash function that receives the query, user access rights of the user, and the timestamp as inputs and generates a value (e.g., an integer value, a string value, etc.) as an output. Once the key is generated, cache client 115 sends, via the connection, the key to the selected cache service instance 120 along with a request for cached data associated with the key. If data associated with the key is stored in cache storage 135, cache client 115 receives the data from the cache service instance 120 and forwards it to query manager 110. Otherwise, cache client 115 receives from the cache service instance 120 a notification that the data is not available in the cache storage 135 (e.g., a cache miss). Cache client 115 then forwards the notification to query manager 110.

If query manager 110 receives data from cache client 115, query manager 110 uses the data to process the query and sends the result set for the query to the client device 105. If query manager 110 receives a notification from cache client 115 that the data is not available in the cache storage 135, query manager 110 retrieves the data from data storage 130, uses the retrieved data to process the query, and sends the result set for the query to the client device 105. Query manager 110 also sends cache client 115 the retrieved data, the query, and a request to cache the data.

Upon receiving the retrieved data, query, and request to cache the data from query manager 110, cache client 115 identifies the user with which the query is associated and accesses user access rights storage 140 to retrieve the user access rights of the user. Also, cache client 115 sends data storage 130 a request for a timestamp associated with the latest change to data in data storage 130. As mentioned above, in some embodiments, when data in data storage 130 is modified, data storage 130 sends cache client 115 a timestamp associated with the modification. In some such embodiments, instead of sending data storage 130 a request for the timestamp associated with the latest change to data storage 130, cache client 115 uses the most recent timestamp received from data storage 130. Next, cache client 115 uses the hash function mentioned above to generate a key based on the query, the user access rights of the user, and the timestamp. Then, cache client 115 selects a cache service instance 120 from the list of available cache service instances, uses the IP address and port number associated with the selected cache service instance 120 to establish a connection to the cache service instance 120, and sends to the selected cache service instance 120, via the connection, the key, the data, and a request to store the data in cache storage 135.

Cache service instances 120*a-m* are each responsible for processing cache requests from cache client 115. For example, a cache service instance 120 may receive from cache client 115 a key and a request to check whether cache storage 135 is storing data associated with the key. In response to such a request, the cache service instance 120 accesses cache storage 135 and determines whether cache storage 135 is storing data associated with the key. If cache storage 135 is storing data associated with the key, the cache service instance 120 retrieves the data and sends it to cache client 115. Otherwise, the cache service instance 120 sends cache client 115 a notification that the data is not available in the cache storage 135. As another example, a cache service instance 120 can receive from cache client 115 a key, data, and a request to store the data in cache storage 135. In response to such a request, the cache service instance 120 stores the data in cache storage 135 and associates the key with the data in cache storage 135.

Cache service instances 120*a-m* may also be responsible for managing the data stored in cache storage 135. For example, in some embodiments, cache service instances 120*a-m* employs any number of different cache eviction algorithms to remove data from cache storage 135 when cache storage 135 is at or near capacity. For example, cache service instances 120*a-m* may use a least recently used (LRU) eviction algorithm. As another example, cache service instances 120*a-m* can use a first in, first out (FIFO) eviction algorithm.

Each of the cache service instances 120*a-m* can also send its respective connection information to service registry 125. For instance, when a cache service instance 120 is initialized (e.g., upon boot up of system 100, when the cache service instance 120 is added to system 100), the cache service instance 120 sends its connection information to service registry 125. In some embodiments, the connection information includes an IP address and a port number of the cache service instance 120 that can be used to connect to the cache service instance 120. If a cache service instance 120 is going to be removed from system 100, the cache service instance 120 sends service registry 125 a request to remove it from the list of cache service instances managed by service registry 125.

Service registry 125 is configured to manage a list of available cache service instances. For example, when service registry 125 receives connection information from a cache service instance 120, service registry 125 adds the cache service instance 120 to the list of available cache service instances along with the connection information of the cache service instance 120. Service registry 125 can also receive a request from a cache service instances 120 to remove it from the list of available cache service instances. In response to such a request, service registry 125 removes the cache service instance and its connection information from the list of available cache service instances. In some instances, service registry 125 may receive from cache client 115 a request for the list of available cache service instances. In response to such a request, service registry 125 sends cache client 115 the list of available cache service instances and their connection information.

Figure 2A:
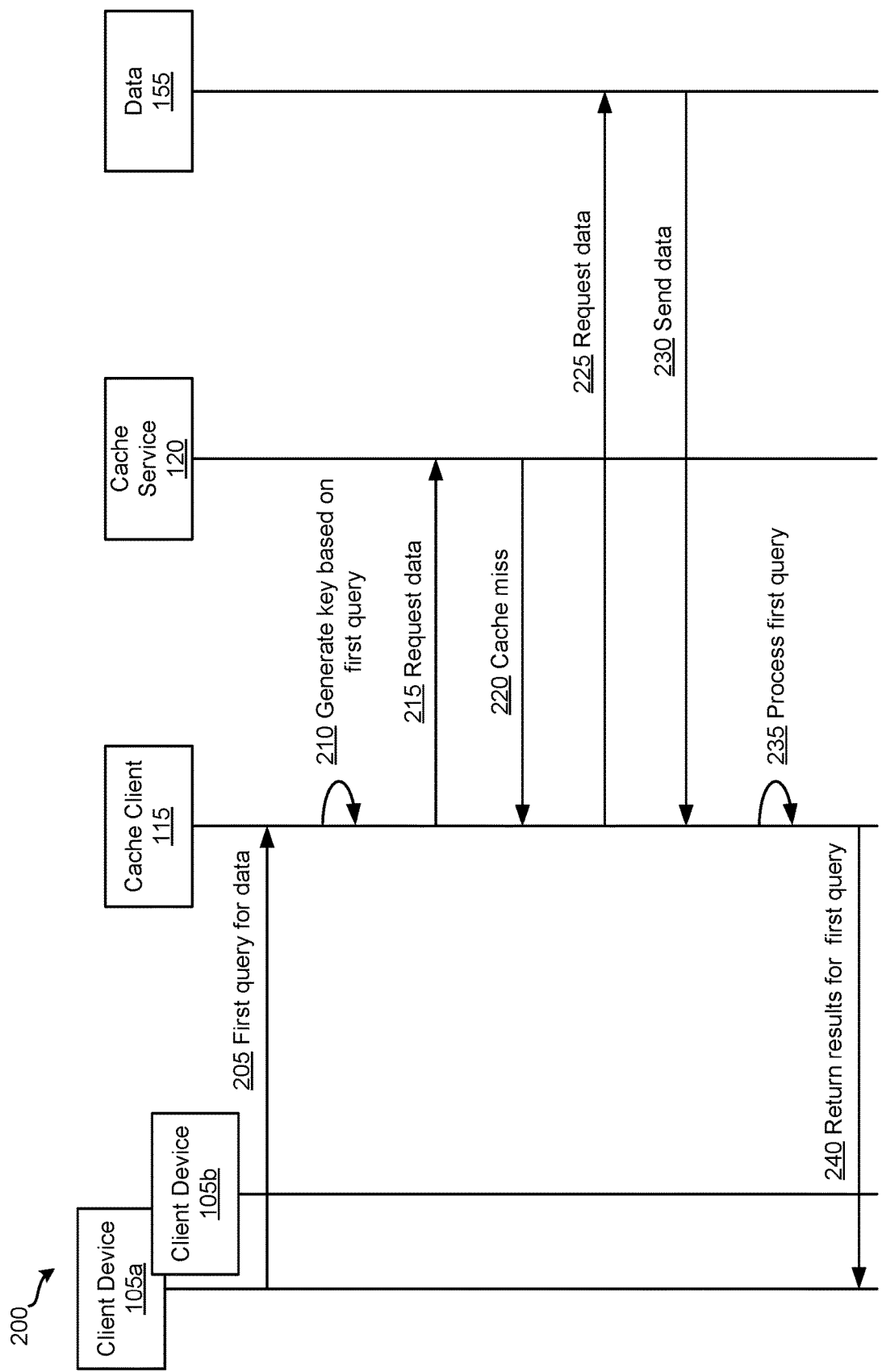
FIGS. 2A and 2B illustrate an example data flow through the system illustrated in FIG. 1 according to some embodiments.
Figure 2B:
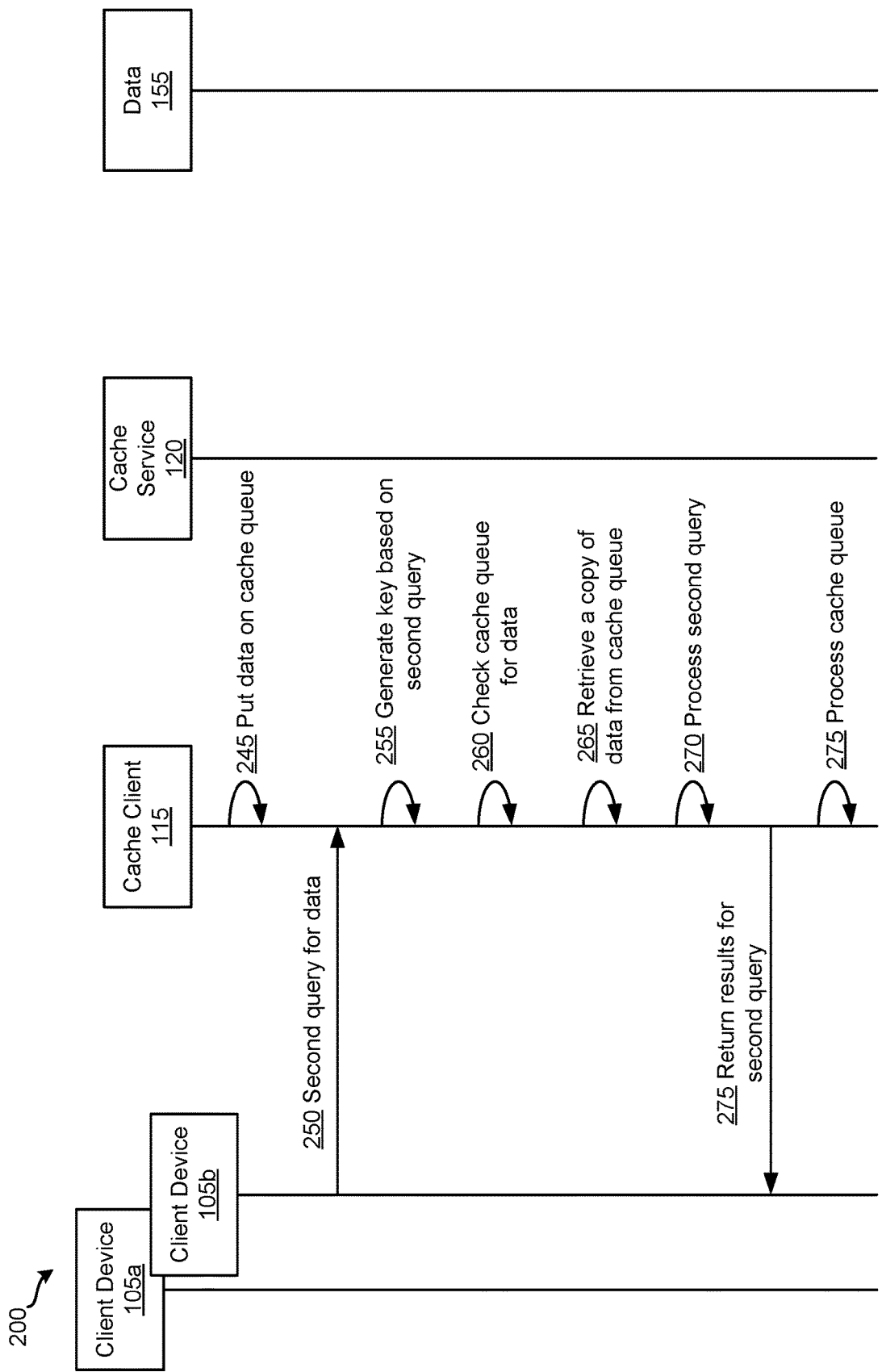

An example operation of system 100 will now be described by reference to FIGS. 2A and 2B. FIGS. 2A and 2B illustrate an example data flow 200 through system 100 according to some embodiments. Referring to FIG. 2A, the example operation of system 100 starts with client device 105*a* sending, at 205, a first query for data stored in data storage 155 to cache client 115. Upon receiving the first query, cache client 115 generates, at 210, a key based on the first query. In this example, cache client 115 generates the key by identifying the user with which the first query is associated, and accessing user access rights storage 140 to retrieve the user access rights of the user. In addition, cache client 115 sends data storage 130 a request for a timestamp associated with the latest change to data in data storage 130. As explained above, in some embodiments, when data in data storage 130 is modified, data storage 130 sends cache client 115 a timestamp associated with the modification. In some such embodiments, instead of sending data storage 130 a request for the timestamp associated with the latest change to data storage 130, cache client 115 uses the most recent timestamp received from data storage 130. Cache client 115 then uses the hash function mentioned above to generate a value based on the first query, the user access rights of the user, and the timestamp.

Next, cache client 115 sends service registry 125 a request for a list of available cache service instances and selects a cache service instance 120 (e.g., using round robin, selecting the least-used cache service instance, etc.) from the list of available cache service instances. Then, cache client 115 sends, at 215, the selected cache service instance 120 the key and a request for data associated with the key. For this example, cache storage 135 is not storing data associated with the key. As such, the cache service instance 120 sends, at 220, cache client 115 a notification that a cache miss has occurred. In response to the notification, cache client 115 sends, at 225, data storage 155 the request for the data. At 230, data storage 155 sends the requested data to cache client 115. Cache client 115 uses the data to process, at 235, the first query and then sends, at 240, the results for the first query to client device 105a.

Referring to FIG. 2B, after sending the results for the first query to client device 105a, cache client 115 puts, at 245, the data retrieved from data storage 155 for the first query and the key associated with the retrieved data (i.e., the key generated at 210) in a cache queue. In some embodiments, the cache queue stores request to cache data in cache storage 155. Cache client 115 may process requests in the cache queue at defined intervals (e.g., once per hour, once per day, once per week, etc.). Client device 105b then sends, at 250, a second query for data stored in data storage 155 to cache client 115. When cache client 115 receives the second query, cache client 115 generates, at 255, a key based on the second query. For this example, cache client 115 generates the key by identifying the user with which the second query is associated, accessing user access rights storage 140 to retrieve the user access rights of the user, and using the hash function mentioned above to generate a value based on the second query, the user access rights of the user, and a timestamp associated with the latest change to data in data storage 130. In some embodiments, cache client 115 requests the timestamp from data storage 130. In other embodiments, data storage 130 sends cache client 115 a timestamp associated with a modification to data in data storage 130 when the data in data storage 130 is modified. In some such other embodiments, cache client 115 uses the most recent timestamp received from data storage 130. In this example, the second query is the same as the first query. In addition, the user access rights of the user with which the first query is associated and the user access rights of the user with which the second query is associated are the same. That is, the user with which the first query is associated and the user with which the second query is associated have the same user access rights. Also, the timestamps used for the first and second keys are the same. Thus, the key that cache client 115 generates based on the second query is the same as the key that cache client 115 generated based on the first query at 210.

Next, cache client 115 checks, at 260, the cache queue for any requests that have a key that matches the key generated based on the second query. For this example, the cache queue is still storing the data retrieved for the first query as well as the key associated with the data. Thus, cache client 115 retrieves, at 265, a copy of the data used for the first query from the cache queue, processes, at 270, the second query, and then sends, at 275, the results for the second query to client device 105b. Finally, cache client 115 processes the requests in cache queue. In this example, the cache queue includes the request to cache data used for the first query. Therefore, cache client 115 selects a cache service instance 120 (e.g., using round robin, selecting the least-used cache service instance, etc.) from the list of available cache service instances, sends the selected cache service instance 120 the data used for the first query, the key associated with the data, and a request to store the data in cache storage 135.

Figure 3A:
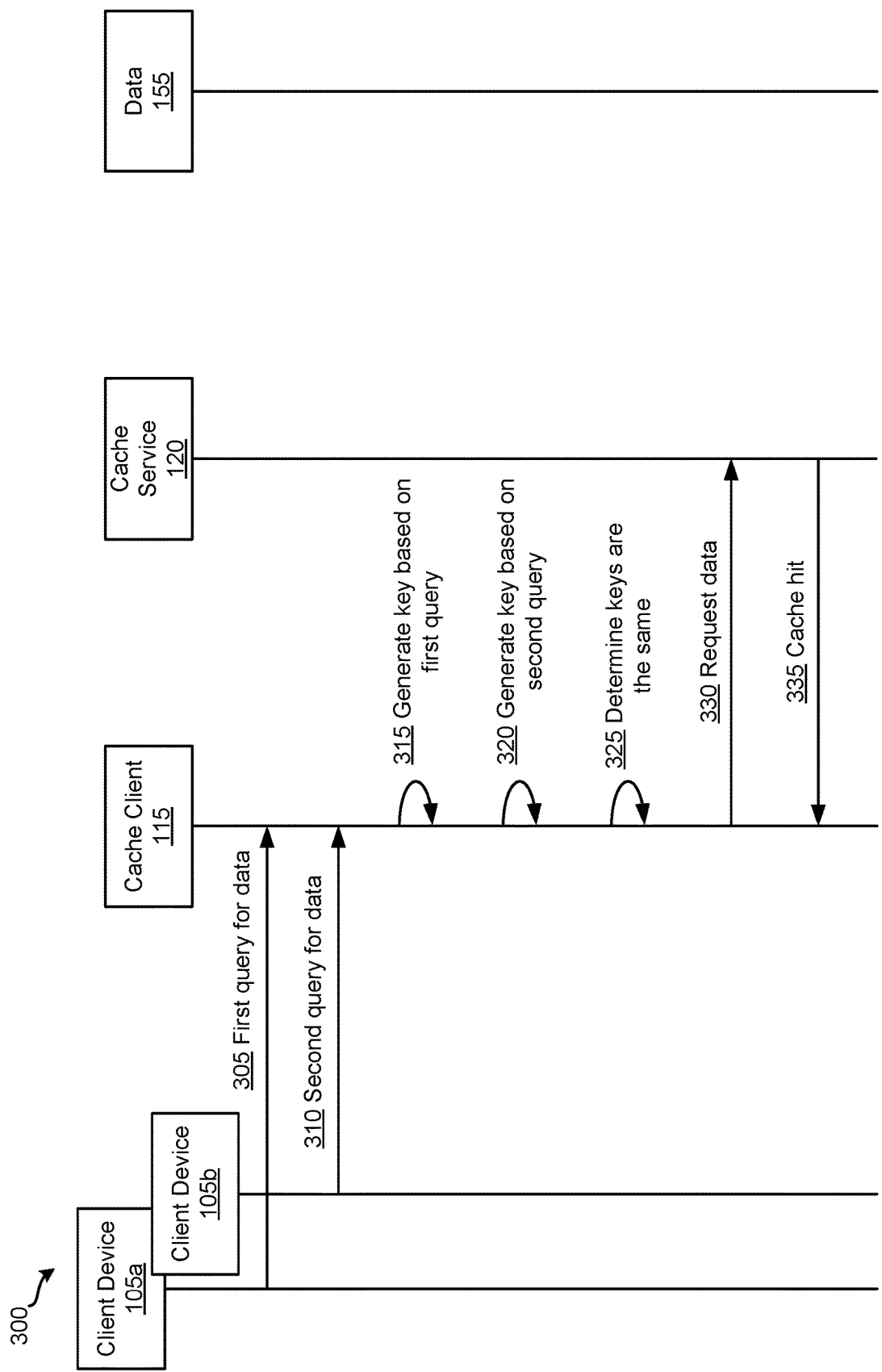
FIGS. 3A and 3B illustrate another example data flow through the system illustrated in FIG. 1 according to some embodiments.
Figure 3B:
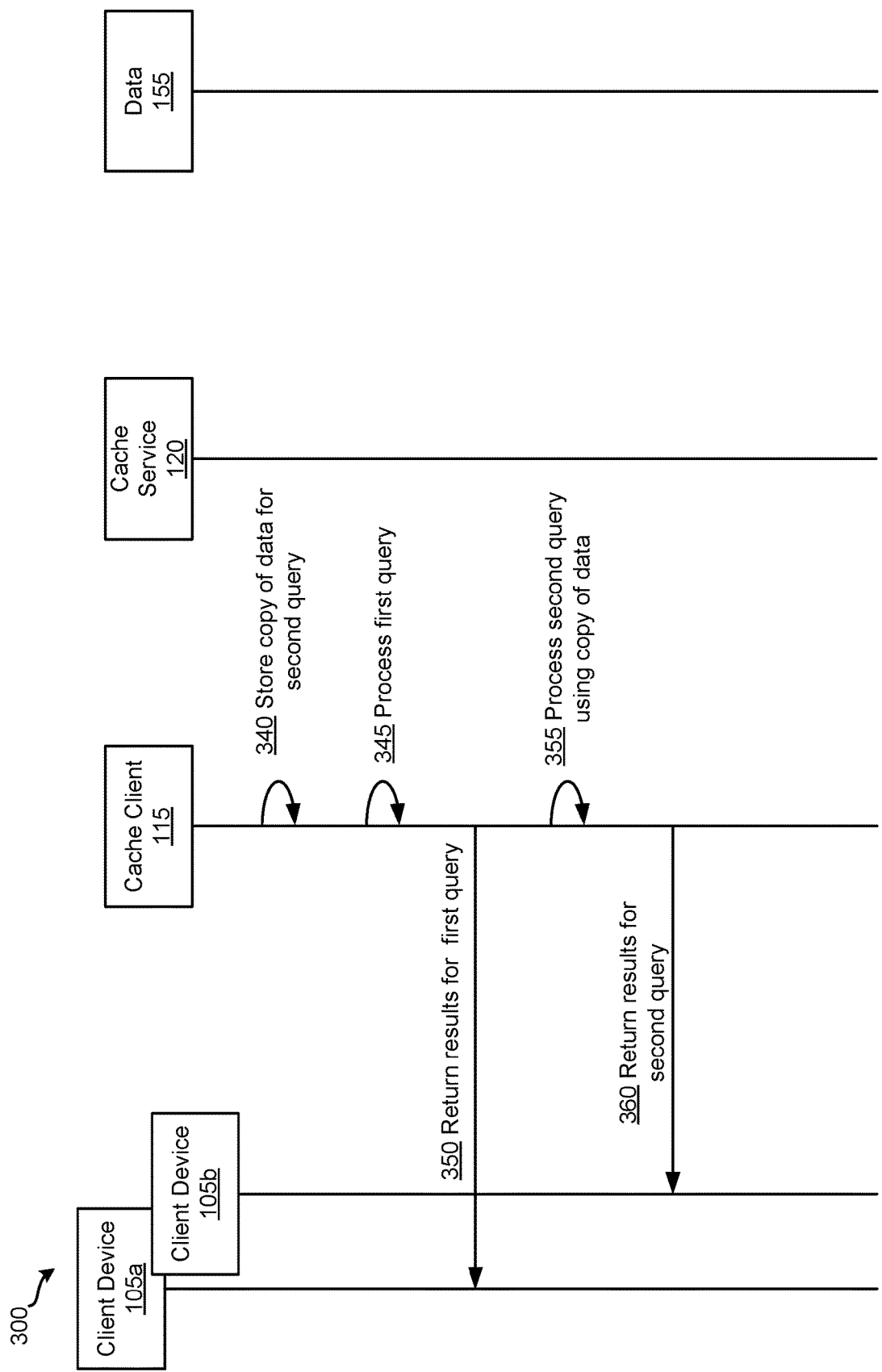

Another example operation of system 100 will now be described by reference to FIGS. 3A and 3B. FIGS. 3A and 3B illustrate an example data flow 300 through system 100 according to some embodiments. Referring to FIG. 3A, the example operation of system 100 begins with client device 105a sending, at 305, a first query for data stored in data storage 155 to cache client 115. Next, client device 105b sends, at 310, a second query for data stored in data storage 155 to cache client 115. When cache client 115 receives the first query, cache client 115 generates, at 315, a key based on the first query. For this example, cache client 115 generates the key by identifying the user with which the first query is associated, accessing user access rights storage 140 to retrieve the user access rights of the user, and using the hash function mentioned above to generate a value based on the first query, the user access rights of the user, and a timestamp associated with the latest change to data in data storage 130. In some embodiments, cache client 115 requests the timestamp from data storage 130. In other embodiments, data storage 130 sends cache client 115 a timestamp associated with a modification to data in data storage 130 when the data in data storage 130 is modified. In some such other embodiments, cache client 115 uses the most recent timestamp received from data storage 130. Similarly, when cache client 115 receives the second query, cache client 115 generates, at 320, a key based on the second query. In this example, cache client 115 generates the key by identifying the user with which the second query is associated, accessing user access rights storage 140 to retrieve the user access rights of the user, and using the hash function mentioned above to generate a value based on the second query, the user access rights of the user, and a timestamp associated with the latest change to data in data storage 130. In some embodiments, cache client 115 requests the timestamp from data storage 130. In other embodiments, data storage 130 sends cache client 115 a timestamp associated with a modification to data in data storage 130 when the data in data storage 130 is modified. In some such other embodiments, cache client 115 uses the most recent timestamp received from data storage 130.

For this example, the first query and the second query are the same. Also, the user access rights of the user with which the first query is associated and the user access rights of the user with which the second query is associated are the same. The timestamps used for the first and second keys are also the same. Therefore, the key that cache client 115 generates based on the first query at 315 is the same as the key that cache client 115 generated based on the second query at 320. Accordingly, cache client 115 compares the keys and determines, at 325, that the keys are the same. Next, cache client 115 sends service registry 125 a request for a list of available cache service instances and selects a cache service instance 120 (e.g., using round robin, selecting the least-used cache service instance, etc.) from the list of available cache service instances. Cache client 115 then sends, at 330, the selected cache service instance 120 the key and a request for data associated with the key. For this example, cache storage 135 is storing data associated with the key. As such, the cache service instance 120 sends, at 335, cache client 115 data associated with the key that is stored in cache storage 135.

Referring to FIG. 3B, cache client 115 stores, at 340, a copy of the data for the second query and uses the data to process, at 345, the first query. Cache client 115 then sends, at 350, the results for the first query to client device 105a. Next, cache client 115 processes, at 355, the second query using the stored copy of the data and sends, at 360, the results for the second query to client device 105b.

Figure 4:
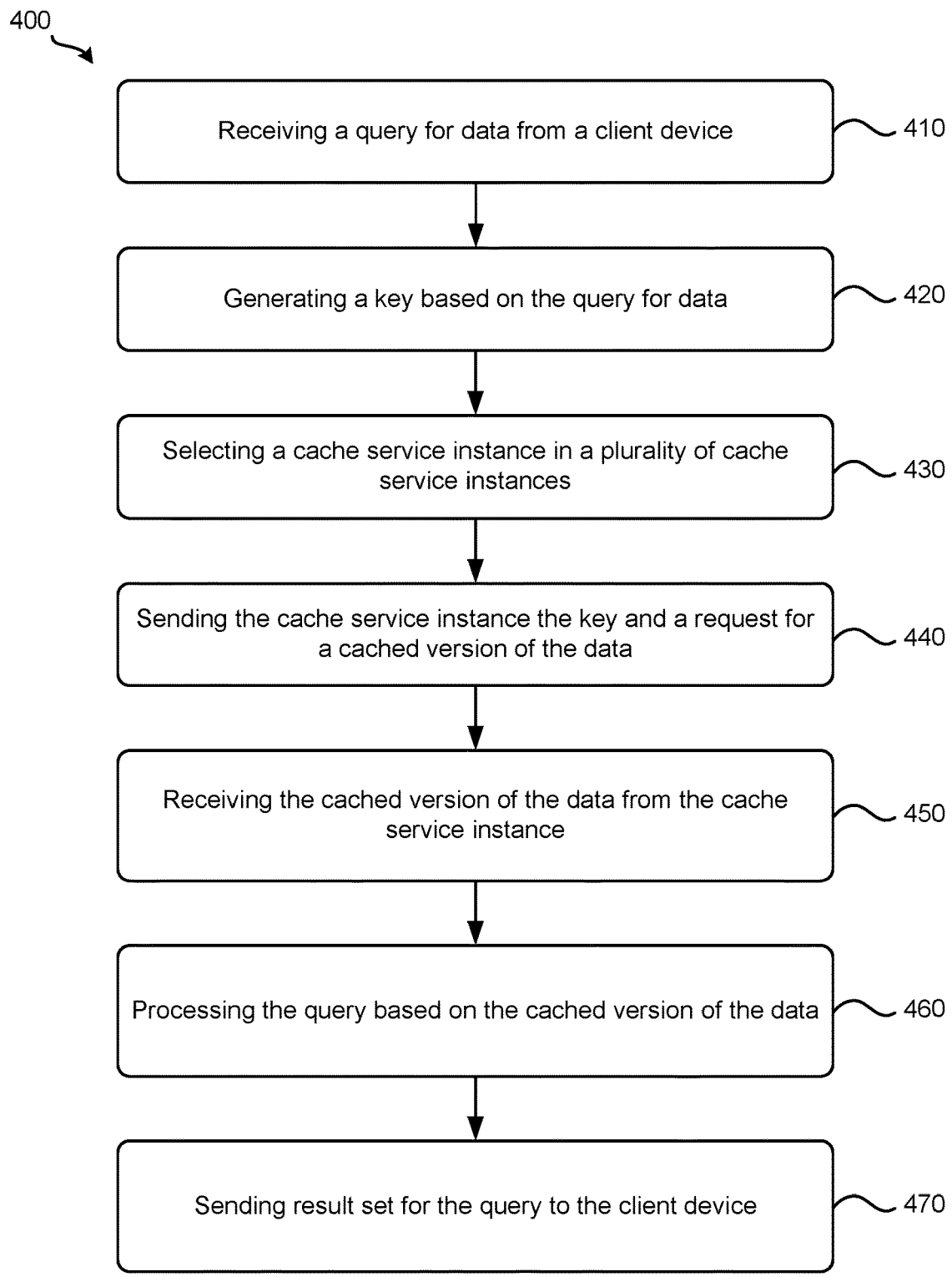
FIG. 4 illustrates a process for processing a query according to some embodiments.

FIG. 4 illustrates a process 400 for processing a query according to some embodiments. In some embodiments, query manager 110 performs process 400. Process 400 starts by receiving, at 410, a query for data from a client device. Referring to FIG. 1 as an example, query manager 110 may receive a query for data stored in data storage 130 from a client device 105. Next, process 400 generates, at 420, a key based on the query for the data. Referring to FIG. 1 as an example, cache client 115 can generate the key by identifying the user with which the query is associated, accessing user access rights storage 140 to retrieve the user access rights of the user, and using the hash function mentioned above to generate a value based on the query, the user access rights of the user, and a timestamp associated with the latest change to data in data storage 130. In some embodiments, cache client 115 requests the timestamp from data storage 130. In other embodiments, data storage 130 sends cache client 115 a timestamp associated with a modification to data in data storage 130 when the data in data storage 130 is modified. In some such other embodiments, cache client 115 uses the most recent timestamp received from data storage 130.

Process 400 then selects, at 430, a cache service instance in a plurality of cache service instances. Referring to FIG. 1 as an example, cache client 115 may send service registry 125 a request for a list of available cache service instances. Then, cache client 115 selects a cache service instance 120 (e.g., using round robin, selecting the least-used cache service instance, etc.) from the list of available cache service instances. Next, process 400 sends, at 440, the cache service instance the key and a request for a cached version of the data. Referring to FIG. 1 as an example, cache client 115 can send the selected cache service instance 120 the key and a request for data associated with the key.

At 450, process 400 receives the cached version of the data from the cache service instance. Referring to FIG. 1 as an example, cache storage 135 is storing data associated with the key and, thus, the cache service instance 120 retrieves the data associated with the key from cache storage 135 and sends it to cache client 115. Process 400 then processes, at 460, the query based on the cached version of the data. Referring to FIG. 1 as example, query manager 110 uses the data to process the query. Finally, process 400 sends, at 470, a result set for the query to the client device. Referring to FIG. 1 as an example, query manager 110 sends the results for the query to the client device 105.

Figure 5:
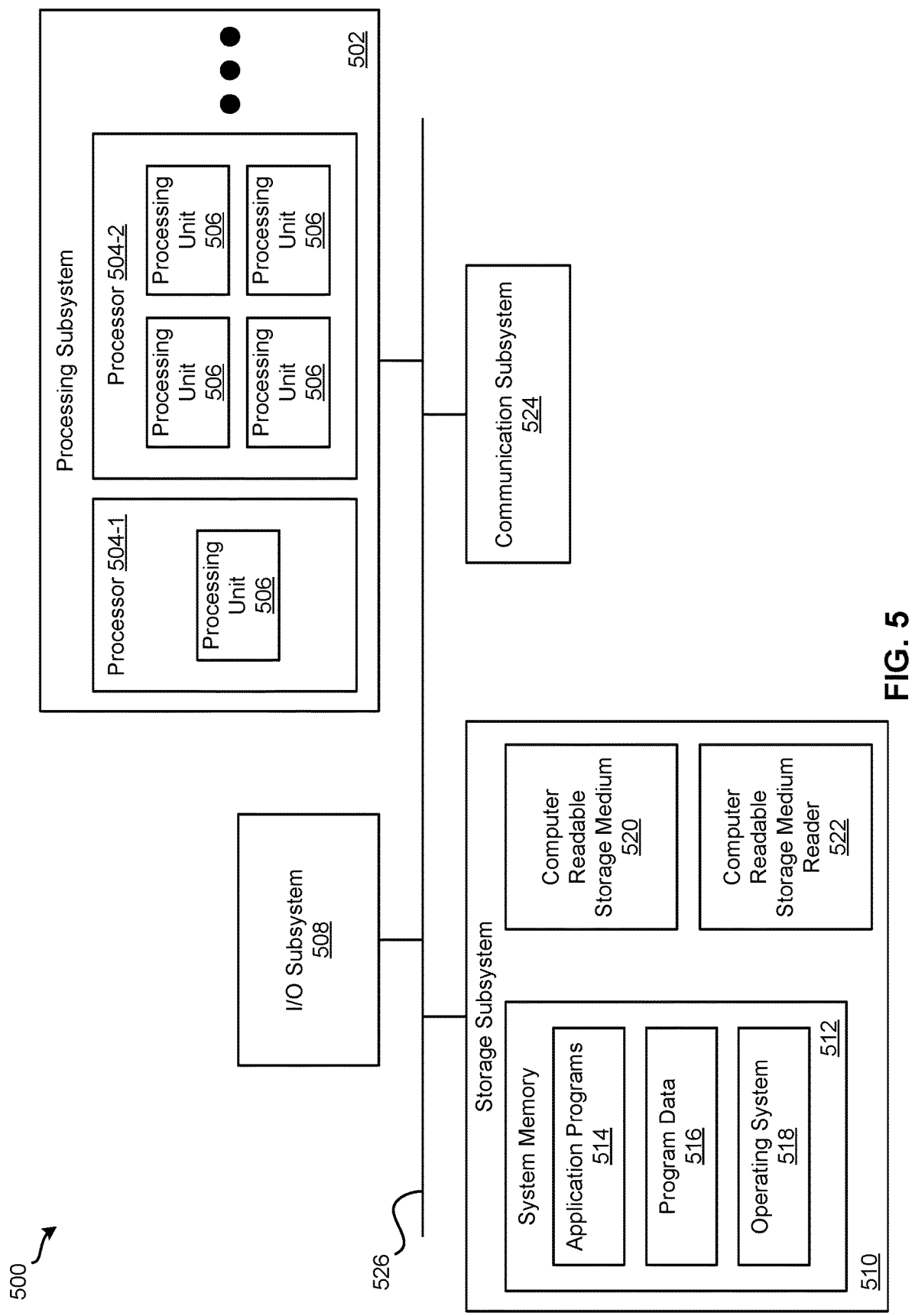
FIG. 5 illustrates an exemplary computer system, in which various embodiments may be implemented.

FIG. 5 illustrates an exemplary computer system 500 for implementing various embodiments described above. For example, computer system 500 may be used to implement client device 105, query manager 110, cache service instances 120a-m. Computer system 500 may be a desktop computer, a laptop, a server computer, or any other type of computer system or combination thereof. Computer system 500 can implement many of the operations, methods, and/or processes described above (e.g., process 400). As shown in FIG. 5, computer system 500 includes processing subsystem 502, which communicates, via bus subsystem 526, with input/output (I/O) subsystem 508, storage subsystem 510 and communication subsystem 524.

Bus subsystem 526 is configured to facilitate communication among the various components and subsystems of computer system 500. While bus subsystem 526 is illustrated in FIG. 5 as a single bus, one of ordinary skill in the art will understand that bus subsystem 526 may be implemented as multiple buses. Bus subsystem 526 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

Processing subsystem 502, which can be implemented as one or more integrated circuits (e.g., a conventional microprocessor or microcontroller), controls the operation of computer system 500. Processing subsystem 502 may include one or more processors 504. Each processor 504 may include one processing unit 506 (e.g., a single core processor such as processor 504-1) or several processing units 506 (e.g., a multicore processor such as processor 504-2). In some embodiments, processors 504 of processing subsystem 502 may be implemented as independent processors while, in other embodiments, processors 504 of processing subsystem 502 may be implemented as multiple processors integrate into a single chip or multiple chips. Still, in some embodiments, processors 504 of processing subsystem 502 may be implemented as a combination of independent processors and multiple processors integrated into a single chip or multiple chips.

In some embodiments, processing subsystem 502 can execute a variety of programs or processes in response to program code and can maintain multiple concurrently executing programs or processes. At any given time, some or all of the program code to be executed can reside in processing subsystem 502 and/or in storage subsystem 510. Through suitable programming, processing subsystem 502 can provide various functionalities, such as the functionalities described above by reference to process 400, etc.

I/O subsystem 508 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 500 to a user or another device (e.g., a printer).

As illustrated in FIG. 5, storage subsystem 510 includes system memory 512, computer-readable storage medium 520, and computer-readable storage medium reader 522. System memory 512 may be configured to store software in the form of program instructions that are loadable and executable by processing subsystem 502 as well as data generated during the execution of program instructions. In some embodiments, system memory 512 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 512 may include different types of memory, such as static random access memory (SRAM) and/or dynamic random access memory (DRAM). System memory 512 may include a basic input/output system (BIOS), in some embodiments, that is configured to store basic routines to facilitate transferring information between elements within computer system 500 (e.g., during start-up). Such a BIOS may be stored in ROM (e.g., a ROM chip), flash memory, or any other type of memory that may be configured to store the BIOS.

As shown in FIG. 5, system memory 512 includes application programs 514, program data 516, and operating system (OS) 518. OS 518 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 520 may be a non-transitory computer-readable medium configured to store software (e.g., programs, code modules, data constructs, instructions, etc.). Many of the components (e.g., query manager 110, cache client 115, cache service instances 120a-m, and service registry 125) and/or processes (e.g., process 400) described above may be implemented as software that when executed by a processor or processing unit (e.g., a processor or processing unit of processing subsystem 502) performs the operations of such components and/or processes. Storage subsystem 510 may also store data used for, or generated during, the execution of the software.

Storage subsystem 510 may also include computer-readable storage medium reader 522 that is configured to communicate with computer-readable storage medium 520. Together and, optionally, in combination with system memory 512, computer-readable storage medium 520 may comprehensively represent remote, local, fixed, and/or removable storage devices plus storage media for temporarily and/or more permanently containing, storing, transmitting, and retrieving computer-readable information.

Computer-readable storage medium 520 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 524 serves as an interface for receiving data from, and transmitting data to, other devices, computer systems, and networks. For example, communication subsystem 524 may allow computer system 500 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 524 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 524 may provide components configured for wired communication (e.g., Ethernet) in addition to or instead of components configured for wireless communication.

One of ordinary skill in the art will realize that the architecture shown in FIG. 5 is only an example architecture of computer system 500, and that computer system 500 may have additional or fewer components than shown, or a different configuration of components. The various components shown in FIG. 5 may be implemented in hardware, software, firmware or any combination thereof, including one or more signal processing and/or application specific integrated circuits.

Figure 6:
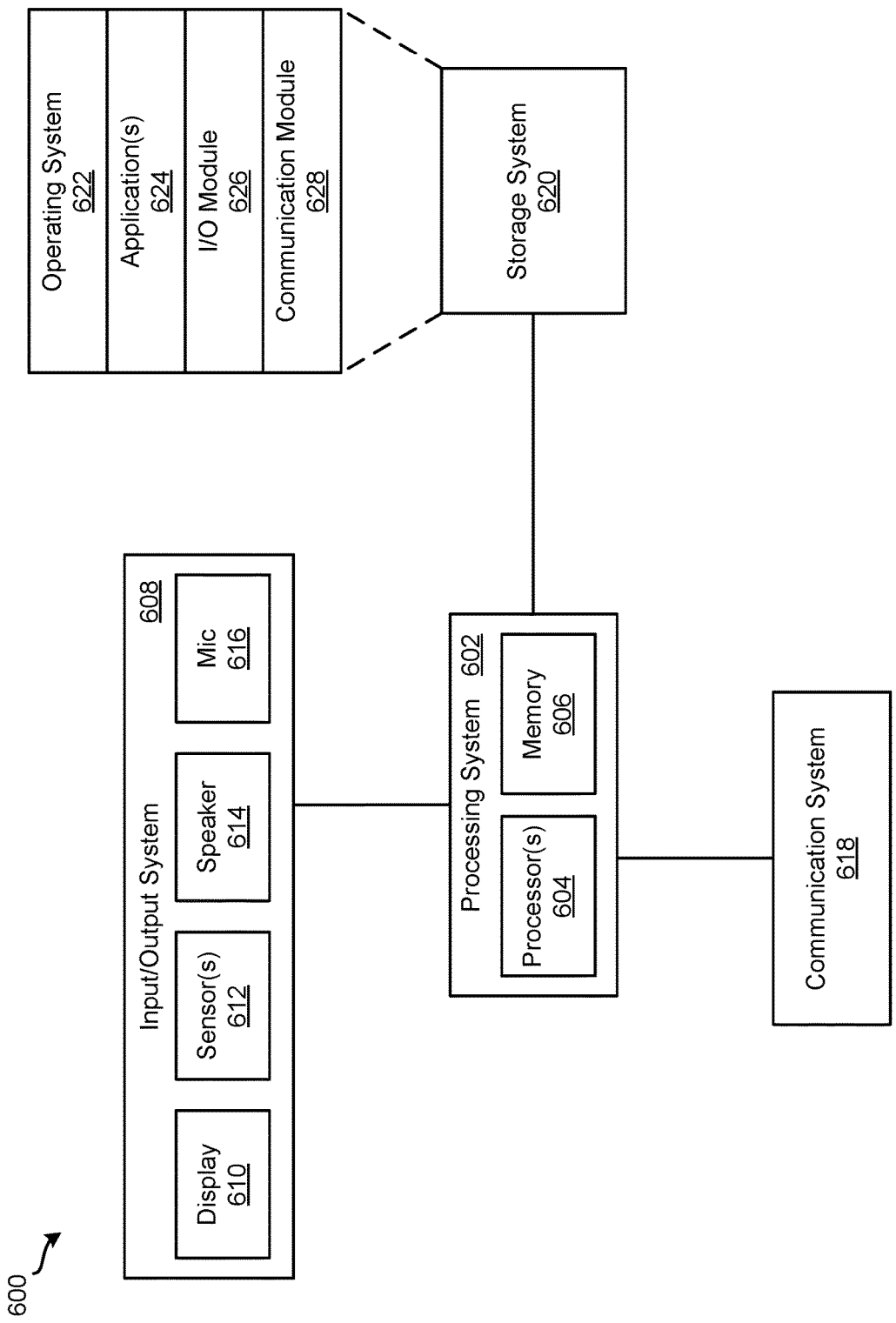
FIG. 6 illustrates an exemplary computing device, in which various embodiments may be implemented.

FIG. 6 illustrates an exemplary computing device 600 for implementing various embodiments described above. For example, computing device 600 may be used to implement client devices 105a-n. Computing device 600 may be a cellphone, a smartphone, a wearable device, an activity tracker or manager, a tablet, a personal digital assistant (PDA), a media player, or any other type of mobile computing device or combination thereof. As shown in FIG. 6, computing device 600 includes processing system 602, input/output (I/O) system 608, communication system 618, and storage system 620. These components may be coupled by one or more communication buses or signal lines.

Processing system 602, which can be implemented as one or more integrated circuits (e.g., a conventional microprocessor or microcontroller), controls the operation of computing device 600. As shown, processing system 602 includes one or more processors 604 and memory 606. Processors 604 are configured to run or execute various software and/or sets of instructions stored in memory 606 to perform various functions for computing device 600 and to process data.

Each processor of processors 604 may include one processing unit (e.g., a single core processor) or several processing units (e.g., a multicore processor). In some embodiments, processors 604 of processing system 602 may be implemented as independent processors while, in other embodiments, processors 604 of processing system 602 may be implemented as multiple processors integrate into a single chip. Still, in some embodiments, processors 604 of processing system 602 may be implemented as a combination of independent processors and multiple processors integrated into a single chip.

Memory 606 may be configured to receive and store software (e.g., operating system 622, applications 624, I/O module 626, communication module 628, etc. from storage system 620) in the form of program instructions that are loadable and executable by processors 604 as well as data generated during the execution of program instructions. In some embodiments, memory 606 may include volatile memory (e.g., random access memory (RAM)), non-volatile memory (e.g., read-only memory (ROM), programmable read-only memory (PROM), erasable programmable read-only memory (EPROM), electrically erasable programmable read-only memory (EEPROM), flash memory, etc.), or a combination thereof.

I/O system 608 is responsible for receiving input through various components and providing output through various components. As shown for this example, I/O system 608 includes display 610, one or more sensors 612, speaker 614, and microphone 616. Display 610 is configured to output visual information (e.g., a graphical user interface (GUI) generated and/or rendered by processors 604). In some embodiments, display 610 is a touch screen that is configured to also receive touch-based input. Display 610 may be implemented using liquid crystal display (LCD) technology, light-emitting diode (LED) technology, organic LED (OLED) technology, organic electro luminescence (OEL) technology, or any other type of display technologies. Sensors 612 may include any number of different types of sensors for measuring a physical quantity (e.g., temperature, force, pressure, acceleration, orientation, light, radiation, etc.). Speaker 614 is configured to output audio information and microphone 616 is configured to receive audio input. One of ordinary skill in the art will appreciate that I/O system 608 may include any number of additional, fewer, and/or different components. For instance, I/O system 608 may include a keypad or keyboard for receiving input, a port for transmitting data, receiving data and/or power, and/or communicating with another device or component, an image capture component for capturing photos and/or videos, etc.

Communication system 618 serves as an interface for receiving data from, and transmitting data to, other devices, computer systems, and networks. For example, communication system 618 may allow computing device 600 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication system 618 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication system 618 may provide components configured for wired communication (e.g., Ethernet) in addition to or instead of components configured for wireless communication.

Storage system 620 handles the storage and management of data for computing device 600. Storage system 620 may be implemented by one or more non-transitory machine-readable mediums that are configured to store software (e.g., programs, code modules, data constructs, instructions, etc.) and store data used for, or generated during, the execution of the software.

In this example, storage system 620 includes operating system 622, one or more applications 624, I/O module 626, and communication module 628. Operating system 622 includes various procedures, sets of instructions, software components and/or drivers for controlling and managing general system tasks (e.g., memory management, storage device control, power management, etc.) and facilitates communication between various hardware and software components. Operating system 622 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Applications 624 can include any number of different applications installed on computing device 600. Examples of such applications may include a browser application, an address book application, a contact list application, an email application, an instant messaging application, a word processing application, JAVA-enabled applications, an encryption application, a digital rights management application, a voice recognition application, location determination application, a mapping application, a music player application, etc.

I/O module 626 manages information received via input components (e.g., display 610, sensors 612, and microphone 616) and information to be outputted via output components (e.g., display 610 and speaker 614). Communication module 628 facilitates communication with other devices via communication system 618 and includes various software components for handling data received from communication system 618.

One of ordinary skill in the art will realize that the architecture shown in FIG. 6 is only an example architecture of computing device 600, and that computing device 600 may have additional or fewer components than shown, or a different configuration of components. The various components shown in FIG. 6 may be implemented in hardware, software, firmware or any combination thereof, including one or more signal processing and/or application specific integrated circuits.

Figure 7:
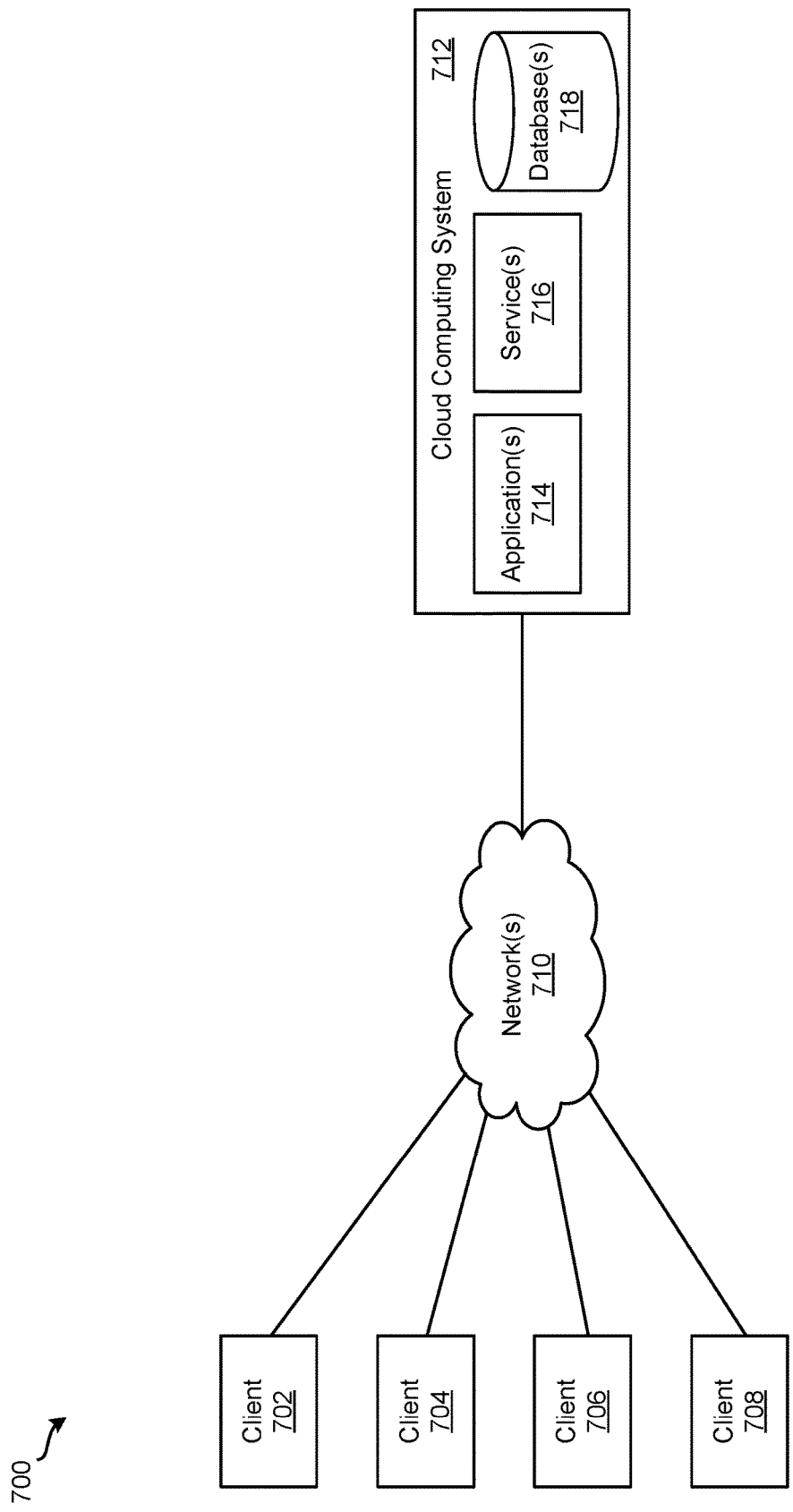
FIG. 7 illustrates system for implementing various embodiments described above.

FIG. 7 illustrates an exemplary system 700 for implementing various embodiments described above. For example, cloud computing system 712 of system 700 may be used to implement query manager 110, cache service instances 120*a-m*, and service registry 125 and client devices 702-708 may be used to implement client devices 105*a-n*. As shown, system 700 includes client devices 702-708, one or more networks 710, and cloud computing system 712. Cloud computing system 712 is configured to provide resources and data to client devices 702-708 via networks 710. In some embodiments, cloud computing system 700 provides resources to any number of different users (e.g., customers, tenants, organizations, etc.). Cloud computing system 712 may be implemented by one or more computer systems (e.g., servers), virtual machines operating on a computer system, or a combination thereof.

As shown, cloud computing system 712 includes one or more applications 714, one or more services 716, and one or more databases 718. Cloud computing system 700 may provide applications 714, services 716, and databases 718 to any number of different customers in a self-service, subscription-based, elastically scalable, reliable, highly available, and secure manner.

In some embodiments, cloud computing system 700 may be adapted to automatically provision, manage, and track a customer's subscriptions to services offered by cloud computing system 700. Cloud computing system 700 may provide cloud services via different deployment models. For example, cloud services may be provided under a public cloud model in which cloud computing system 700 is owned by an organization selling cloud services and the cloud services are made available to the general public or different industry enterprises. As another example, cloud services may be provided under a private cloud model in which cloud computing system 700 is operated solely for a single organization and may provide cloud services for one or more entities within the organization. The cloud services may also be provided under a community cloud model in which cloud computing system 700 and the cloud services provided by cloud computing system 700 are shared by several organizations in a related community. The cloud services may also be provided under a hybrid cloud model, which is a combination of two or more of the aforementioned different models.

In some instances, any one of applications 714, services 716, and databases 718 made available to client devices 702-708 via networks 710 from cloud computing system 700 is referred to as a "cloud service." Typically, servers and systems that make up cloud computing system 700 are different from the on-premises servers and systems of a customer. For example, cloud computing system 700 may host an application and a user of one of client devices 702-708 may order and use the application via networks 710.

Applications 714 may include software applications that are configured to execute on cloud computing system 712 (e.g., a computer system or a virtual machine operating on a computer system) and be accessed, controlled, managed, etc. via client devices 702-708. In some embodiments, applications 714 may include server applications and/or mid-tier applications (e.g., HTTP (hypertext transport protocol) server applications, FTP (file transfer protocol) server applications, CGI (common gateway interface) server applications, JAVA server applications, etc.). Services 716 are software components, modules, application, etc. that are configured to execute on cloud computing system 712 and provide functionalities to client devices 702-708 via networks 710. Services 716 may be web-based services or on-demand cloud services.

Databases 718 are configured to store and/or manage data that is accessed by applications 714, services 716, and/or client devices 702-708. For instance, storages 130-140 may be stored in databases 718. Databases 718 may reside on a non-transitory storage medium local to (and/or resident in) cloud computing system 712, in a storage-area network (SAN), on a non-transitory storage medium local located remotely from cloud computing system 712. In some embodiments, databases 718 may include relational databases that are managed by a relational database management system (RDBMS). Databases 718 may be a column-oriented databases, row-oriented databases, or a combination thereof. In some embodiments, some or all of databases 718 are in-memory databases. That is, in some such embodiments, data for databases 718 are stored and managed in memory (e.g., random access memory (RAM)).

Client devices 702-708 are configured to execute and operate a client application (e.g., a web browser, a proprietary client application, etc.) that communicates with applications 714, services 716, and/or databases 718 via networks 710. This way, client devices 702-708 may access the various functionalities provided by applications 714, services 716, and databases 718 while applications 714, services 716, and databases 718 are operating (e.g., hosted) on cloud computing system 700. Client devices 702-708 may be computer system 500 or computing device 600, as described above by reference to FIGS. 5 and 6, respectively. Although system 700 is shown with four client devices, any number of client devices may be supported.

Networks 710 may be any type of network configured to facilitate data communications among client devices 702-708 and cloud computing system 712 using any of a variety of network protocols. Networks 710 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A non-transitory machine-readable medium storing a program executable by at least one processing unit of a device, the program comprising sets of instructions for:
   receiving a query for data from a client device;
   generating a key based on the query for the data;
   sending a service registry a request for available cache service instances;
   receiving, from the service registry, a list of a plurality of cache service instances and a plurality of connection information associated with the plurality of cache service instances;
   selecting a cache service instance in the list of the plurality of cache service instances;
   using the connection information associated with the cache service instance to connect to the cache service instance and send the cache service instance the key and a request for a cached version of the data;
   receiving the cached version of the data from the cache service instance;
   processing the query based on the cached version of the data; and
   sending a result set for the query to the client device.

2. The non-transitory machine-readable medium of claim 1, wherein the query for the data is a first query for a first data, wherein the client device is a first client device, wherein the key is a first key, wherein the cache service instance is a first cache service instance, wherein the request is a first request, wherein the result set is a first result set, wherein the program further comprises sets of instructions for:
   receiving a second query for second data from a second client device;
   generating a second key based on the second query for the second data;
   selecting a second cache service instance in the list of the plurality of cache service instances;
   using the connection information associated with the second cache service instance to connect to the second cache service instance and send the second cache service instance the second key and a second request for a cached version of the second data;

receiving the cached version of the second data from the second cache service instance;
processing the second query based on the cached version of the second data; and
sending a second result set for the second query to the second client device.

3. The non-transitory machine-readable medium of claim 1, wherein the query for the data is a first query for a first data, wherein the client device is a first client device, wherein the key is a first key, wherein the cache service instance is a first cache service instance, wherein the request is a first request, wherein the result set is a first result set, wherein the program further comprises sets of instructions for:
receiving a second query for second data from a second client device;
generating a second key based on the second query for the second data;
determining that the first key and the second key are the same;
storing a copy of the cached version of the first data;
processing the second query based on the copy of the cached version of the first data; and
sending a second result set for the second query to the second client device.

4. The non-transitory machine-readable medium of claim 1, wherein the program further comprises sets of instructions for:
identifying a user with which the query is associated; and
retrieving user access rights of the user,
wherein generating the key is further based on the user access rights of the user.

5. The non-transitory machine-readable medium of claim 1, wherein the plurality of cache service instances operate on a computing device separate from the device.

6. The non-transitory machine-readable medium of claim 1, wherein the program further comprises sets of instructions for:
receiving an indication of a cache miss instead of the cached version of the data from the cache service instance;
in response to receiving the indication, sending a request for the data to a data storage configured to store the data;
receiving the data from the data storage; and
sending the cache service instance the data from the database and a request to cache the data,
wherein processing the query is based on the data from the data storage instead of the cached version of the data.

7. The non-transitory machine-readable medium of claim 6, wherein the query for the data is a first query for a first data, wherein the client device is a first client device, wherein the key is a first key, wherein the cache service instance is a first cache service instance, wherein the request is a first request, wherein the result set is a first result set, wherein the program further comprises sets of instructions for:
putting the data from the database and the first key in a cache queue;
receiving a second query for second data from a second client device;
generating a second key based on the second query for the second data;
determining that the second key and the matches the first key in the cache queue;
retrieving a copy of the cached version of the first data from the cache queue;
processing the second query based on the copy of the cached version of the first data; and
sending a second result set for the second query to the second client device.

8. A method comprising:
receiving a query for data from a client device;
generating a key based on the query for the data;
sending a service registry a request for available cache service instances;
receiving, from the service registry, a list of a plurality of cache service instances and a plurality of connection information associated with the plurality of cache service instances;
selecting a cache service instance in the list of the plurality of cache service instances;
using the connection information associated with the cache service instance to send the cache service instance the key and a request for a cached version of the data;
receiving the cached version of the data from the cache service instance;
processing the query based on the cached version of the data; and
sending a result set for the query to the client device.

9. The method of claim 8, wherein the query for the data is a first query for a first data, wherein the client device is a first client device, wherein the key is a first key, wherein the cache service instance is a first cache service instance, wherein the request is a first request, wherein the result set is a first result set, wherein the method further comprises:
receiving a second query for second data from a second client device;
generating a second key based on the second query for the second data;
selecting a second cache service instance in the list of the plurality of cache service instances;
using the connection information associated with the second cache service instance to connect to the second cache service instance and send the second cache service instance the second key and a second request for a cached version of the second data;
receiving the cached version of the second data from the second cache service instance;
processing the second query based on the cached version of the second data; and
sending a second result set for the second query to the second client device.

10. The method of claim 8, wherein the query for the data is a first query for a first data, wherein the client device is a first client device, wherein the key is a first key, wherein the cache service instance is a first cache service instance, wherein the request is a first request, wherein the result set is a first result set, wherein the method further comprises:
receiving a second query for second data from a second client device;
generating a second key based on the second query for the second data;
determining that the first key and the second key are the same;
storing a copy of the cached version of the first data;
processing the second query based on the copy of the cached version of the first data; and
sending a second result set for the second query to the second client device.

11. The method of claim 8 further comprising:
identifying a user with which the query is associated; and
retrieving user access rights of the user, wherein generating the key is further based on the user access rights of the user.

12. The method of claim 8, wherein the method operates on a first computing device and the plurality of cache service instances operate on a second, different computing device.

13. The method of claim 8 further comprising:
receiving an indication of a cache miss instead of the cached version of the data from the cache service instance;
in response to receiving the indication, sending a request for the data to a data storage configured to store the data;
receiving the data from the data storage; and
sending the cache service instance the data from the database and a request to cache the data,
wherein processing the query is based on the data from the data storage instead of the cached version of the data.

14. The method of claim 13, wherein the query for the data is a first query for a first data, wherein the client device is a first client device, wherein the key is a first key, wherein the cache service instance is a first cache service instance, wherein the request is a first request, wherein the result set is a first result set, wherein the program further comprises sets of instructions for:
putting the data from the database and the first key in a cache queue;
receiving a second query for second data from a second client device;
generating a second key based on the second query for the second data;
determining that the second key and the matches the first key in the cache queue;
retrieving a copy of the cached version of the first data from the cache queue;
processing the second query based on the copy of the cached version of the first data; and
sending a second result set for the second query to the second client device.

15. A system comprising:
a set of processing units; and
a non-transitory computer-readable medium storing instructions that when executed by at least one processing unit in the set of processing units cause the at least one processing unit to:
receive a query for data from a client device;
generate a key based on the query for the data;
send a service registry a request for available cache service instances;
receive, from the service registry, a list of a plurality of cache service instances and a plurality of connection information associated with the plurality of cache service instances;
select a cache service instance in the list of the plurality of cache service instances;
use the connection information associated with the cache service instance to send the cache service instance the key and a request for a cached version of the data;
receive the cached version of the data from the cache service instance;
process the query based on the cached version of the data; and
send a result set for the query to the client device.

16. The system of claim 15, wherein the query for the data is a first query for a first data, wherein the client device is a first client device, wherein the key is a first key, wherein the cache service instance is a first cache service instance, wherein the request is a first request, wherein the result set is a first result set, wherein the instructions further cause the at least one processing unit to:
receive a second query for second data from a second client device;
generate a second key based on the second query for the second data;
select a second cache service instance in the list of the plurality of cache service instances;
use the connection information associated with the second cache service instance to connect to the second cache service instance and send the second cache service instance the second key and a second request for a cached version of the second data;
receive the cached version of the second data from the second cache service instance;
process the second query based on the cached version of the second data; and
send a second result set for the second query to the second client device.

17. The system of claim 15, wherein the query for the data is a first query for a first data, wherein the client device is a first client device, wherein the key is a first key, wherein the cache service instance is a first cache service instance, wherein the request is a first request, wherein the result set is a first result set, wherein the instructions further cause the at least one processing unit to:
receive a second query for second data from a second client device;
generate a second key based on the second query for the second data;
determine that the first key and the second key are the same;
store a copy of the cached version of the first data;
process the second query based on the copy of the cached version of the first data; and
send a second result set for the second query to the second client device.

18. The system of claim 15, wherein the instructions further cause the at least one processing unit to:
identify a user with which the query is associated; and
retrieve user access rights of the user,
wherein generating the key is further based on the user access rights of the user.

19. The system of claim 15, wherein the plurality of cache service instances operate on a computing device separate from the system.

20. The system of claim 15, wherein the instructions further cause the at least one processing unit to:
receive an indication of a cache miss instead of the cached version of the data from the cache service instance;
in response to receiving the indication, send a request for the data to a data storage configured to store the data;
receive the data from the data storage; and
send the cache service instance the data from the database and a request to cache the data,
wherein processing the query is based on the data from the data storage instead of the cached version of the data.

* * * * *